(12) United States Patent
Benyo et al.

(10) Patent No.: US 9,578,058 B2
(45) Date of Patent: Feb. 21, 2017

(54) METHOD AND INTERNET TERMINAL FOR REMOTELY PERFORMING OPERATIONS ON A SECURE ELEMENT CONNECTED TO A COMMUNICATION DEVICE

(76) Inventors: Balazs Istvan Benyo, Budapest (HU);
Andras Vilmos, Budapest (HU);
Gergely Fordos, Budapest (HU)

( * ) Notice: Subject to any disclaimer, the term of this patent is extended or adjusted under 35 U.S.C. 154(b) by 422 days.

(21) Appl. No.: 14/364,889

(22) PCT Filed: Dec. 14, 2011

(86) PCT No.: PCT/HU2011/000123
§ 371 (c)(1),
(2), (4) Date: Sep. 26, 2014

(87) PCT Pub. No.: WO2013/088180
PCT Pub. Date: Jun. 20, 2013

(65) Prior Publication Data
US 2015/0033290 A1 Jan. 29, 2015

(51) Int. Cl.
*H04L 29/06* (2006.01)
*H04W 12/08* (2009.01)
(Continued)

(52) U.S. Cl.
CPC ......... *H04L 63/18* (2013.01); *G06F 17/30905* (2013.01); *H04L 67/02* (2013.01);
(Continued)

(58) Field of Classification Search
CPC .......... H04L 63/18; H04L 67/34; H04L 67/02; H04L 67/141; H04W 12/08; G06F 17/30905
See application file for complete search history.

(56) References Cited

U.S. PATENT DOCUMENTS

2007/0143828 A1* 6/2007 Jeal ................ G06F 21/123
726/4

* cited by examiner

*Primary Examiner* — Jeffrey Pwu
*Assistant Examiner* — Thong Truong
(74) *Attorney, Agent, or Firm* — Olson & Cepuritis, Ltd.

(57) ABSTRACT

The invention relates to a method for remotely performing operations determined by a service provider on a secure element connected to a communication device having a user application capable of IP based communication, characterized by providing a non service provider specific Internet terminal client module for the user application for establishing connection with the secure element; obtaining context parameters for connection to an Internet terminal provider module hosted on a remote server via the user application, launching the Internet terminal client module by the user application, using the context parameters to establish remote connection between the Internet terminal provider module and the Internet terminal client module, detecting the secure element connected to the communication device via the Internet terminal client module, opening a virtual communication channel between the Internet terminal provider module and the secure element over the connection between the Internet terminal client module and the Internet terminal provider module, transmitting secure element commands determined by the service provider to the secure element over the virtual communication channel and performing an operation corresponding to the secure element commands on the secure element. The invention further relates to an Internet terminal comprising an Internet terminal provider module for remotely performing operations determined by a service provider on a secure element connected to a communication device having a user application capable of IP based communication, characterized by comprising a non service provider specific Internet terminal client module that can be launched by the user application which Internet (Continued)

terminal client module is configured to establish connection with the secure element, and to connect to the Internet terminal provider module and to open a virtual communication channel between the Internet terminal provider module and the secure element, which virtual communication channel is adapted to transmit secure element commands to the secure element for performing operations determined by the service provider.

13 Claims, 4 Drawing Sheets

(51) Int. Cl.
  *H04L 29/08* (2006.01)
  *G06F 17/30* (2006.01)
(52) U.S. Cl.
  CPC ............ *H04L 67/141* (2013.01); *H04L 67/34* (2013.01); *H04W 12/08* (2013.01)

METHOD AND INTERNET TERMINAL FOR REMOTELY PERFORMING OPERATIONS ON A SECURE ELEMENT CONNECTED TO A COMMUNICATION DEVICE

CROSS-REFERENCE TO RELATED APPLICATIONS

This application is a U.S. National Phase of PCT/HU2011/000123, filed Dec. 14, 2011, which is incorporated herein by reference.

The present invention relates to a method for remotely performing operations determined by a service provider on a secure element connected to a communication device having a user application capable of IP based communication. The invention further relates to an Internet terminal comprising an Internet terminal provider module for remotely performing operations determined by a service provider on a secure element connected to a communication device having a user application capable of IP based communication.

Secure elements such as plastic chip cards (so called smart cards), have a quickly growing application in various fields such as computer security, public transport, high-security identification, payment, access control, mobile communication (SIM), etc. In financial applications smart cards may serve as bank cards, fuel cards, authorization cards for pay television, preloaded payment cards, public transport and public phone payment cards. Smart cards may also be used as electronic wallets. The smart card chip can be "loaded" with funds to pay parking meters and vending machines or at various merchants. A single smart card may have a number of independent dedicated applications, for example smart cards provided to students at schools and colleges can be used as IDs for tracking student attendance, as an electronic purse, to pay for items at canteens, vending machines etc., for tracking and monitoring food choices at the canteen, to help the student maintain a healthy diet, and for tracking rentals from the school library as well as transport cards to provide discounts for the students.

In the context of the present invention secure element has a broader meaning than smart cards since many of the above implementations may also be realized in a software environment (we may call it trusted execution environment) other than a smart card, which can ensure similar level of security and protection. The term secure element is generally understood to encompass solutions that ensure authorised access to stored information, as in the case of the known trusted execution environment. There may also be available hardware solutions—hardware security modules—which also ensure the secure operating environment required.

In order to load and install the required application(s) on to the chip of a smart card (secure element) or the funds, credits or any credentials that will provide certain rights or access to certain services (e.g. amount of money available on an ATM card or a fuel card, number of available tickets on a public transport card, security identifier on an entry card, etc.) prior art smart cards have to be placed into or adjacent to a dedicated terminal, which can thus perform pre-programmed operations on the chip of the smart card.

One of the drawbacks associated with the prior art process of writing/programming smart cards is that the prior art dedicated terminals are unable to load new applications of a new service provider that is unknown to the operator of the terminal. Furthermore, the prior art terminals are pre-configured for a certain use and have built-in security applications. Also the prior art terminals are designed and built specifically for performing certain operations on a smart card in connection with a given application.

It is an objective of the present invention to overcome the problems associated with the prior art. In particular, it is an objective of the invention to provide a terminal that is able to load and manage any arbitrary application onto a secure element (smart card). It is a further objective to provide a terminal that can be dynamically configured, real time, for any given purpose in order to handle any secure element application. It is a further objective to allow the application of any kind of security protocol required for performing a given operation on the secure element (such as loading or managing a product/service). It is a further objective to allow a conventional communication device (e.g. personal computer, smart phone, etc.) with a conventional secure element interface (e.g. a smart card reader) to be used for performing operations on a secure element without requiring any hardware modifications.

The above objectives are reached by providing a method for remotely performing operations determined by a service provider on a secure element connected to a communication device having a user application capable of IP based communication, characterised by
  providing a non service provider specific Internet terminal client module for the user application for establishing connection with the secure element;
  obtaining context parameters for connection to an Internet terminal provider module hosted on a remote server via the user application,
  launching the Internet terminal client module by the user application,
  using the context parameters to establish remote connection between the Internet terminal provider module and the Internet terminal client module,
  detecting the secure element connected to the communication device via the Internet terminal client module,
  opening a virtual communication channel between the Internet terminal provider module and the secure element over the connection between the Internet terminal client module and the Internet terminal provider module,
  transmitting secure element commands determined by the service provider to the secure element over the virtual communication channel and performing an operation corresponding to the secure element commands on the secure element.

In a second aspect the above objectives are reached by providing an Internet terminal comprising an Internet terminal provider module for remotely performing operations determined by a service provider on a secure element connected to a communication device having a user application capable of IP based communication, characterised by comprising a non service provider specific Internet terminal client module that can be launched by the user application which Internet terminal client module is configured to establish connection with the secure element, and to connect to the Internet terminal provider module and to open a virtual communication channel between the Internet terminal provider module and the secure element, which virtual communication channel is adapted to transmit secure element commands to the secure element for performing operations determined by the service provider.

Particularly preferred embodiments of the invention are defined in the attached dependent claims.

Further details of the invention will be apparent from the accompanying figures and exemplary embodiments.

Figure 1:
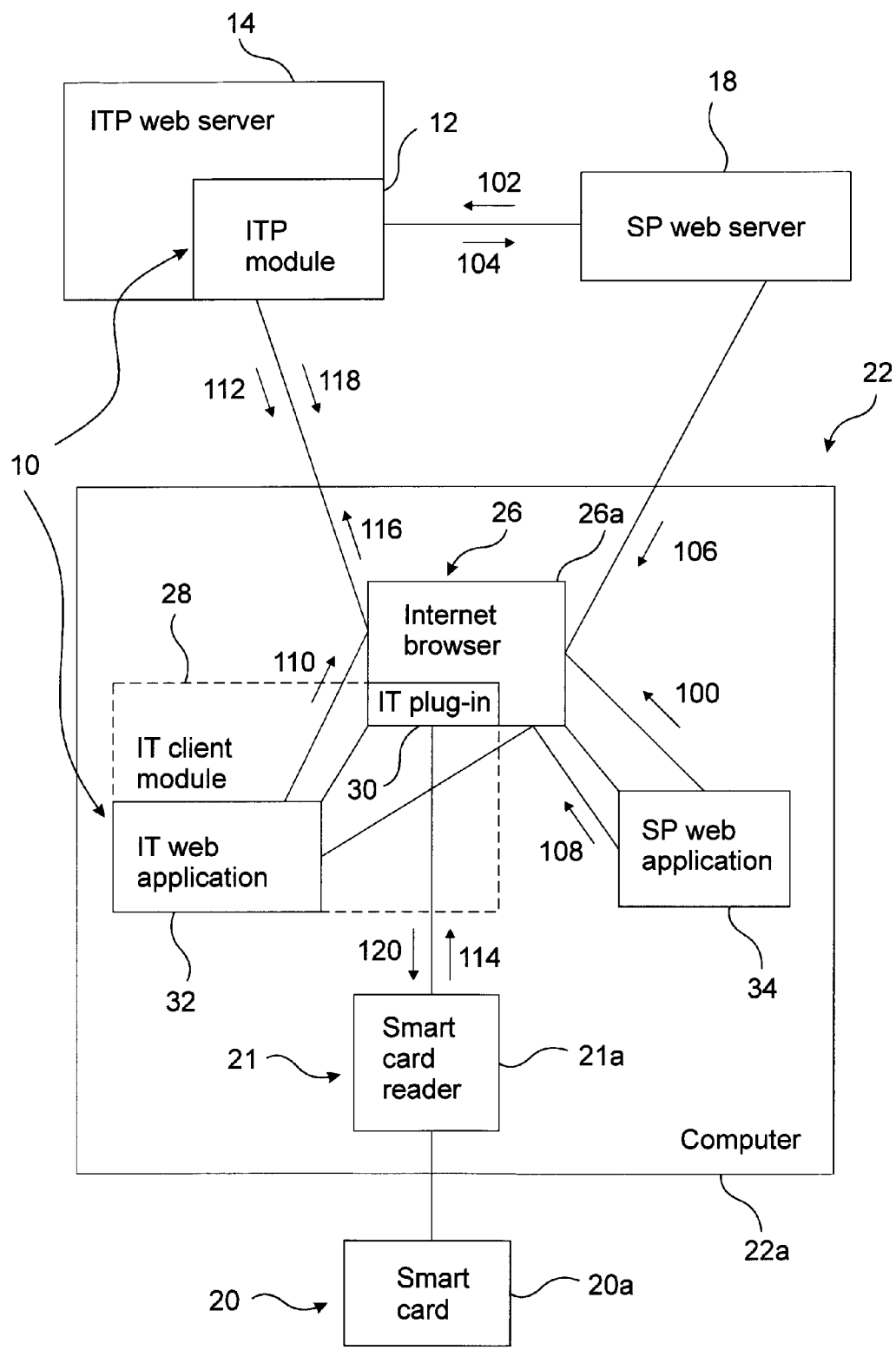
FIG. 1 is a schematic diagram illustrating the application of an Internet terminal according to a first embodiment of the invention.

FIG. 1 schematically illustrates a first preferred embodiment of a non service provider specific Internet terminal 10 in accordance with the present invention. The Internet terminal 10 comprises an Internet terminal provider module 12 (ITP module) hosted on a remote web server 14, which is an Internet terminal provider's web server 14 in the present embodiment. The ITP module 12 is provided for remotely performing operations on a secure element 20, such as a smart card 20a, connected to a communication device 22 of a user via a secure element interface 21 which is a smart card reader 21a in the present embodiment. In the context of the present invention a smart card is understood to include plastic chip cards, SIM cards, smart micro SD cards, or cards integrated in a device (e.g. a mobile phone) that have a contact or contactless communication interface like the ISO 14443 standard and/or ISO 7816 standard or other similar specifications, as well as memory cards (e.g. MiFare) of different standards. The smart card reader 21a of the communication device 22 may be a built-in integral part of the communication device 22 or an external reader connected to the communication device via USB or other type of interface. The connection between the smart card 20a and the communication device 22 may involve placing the smart card 20a into the smart card reader 21a or the connection may be a wireless connection between the smart card reader 21a and the smart card 20a, e.g. using NFC (near field communication), Bluetooth, infra or any other standard data transmission method.

The communication device 22 can be any type of computer, tablet, mobile phone, etc. that is running a user application 26 capable of IP based communication, which may be a conventional Internet browser 26a. Optionally the user application 26 capable of IP based communication may be an application independent of any Internet browser. In the embodiment illustrated in FIG. 1 the communication device 22 is a computer 22a, and the user application 26 is an Internet browser 26a.

The Internet terminal 10 further comprises a non service provider specific Internet terminal client module 28 (IT client module) that is downloaded to the computer 22a from the ITP web server 14.

In the present embodiment depicted in FIG. 1 the IT client module 28 comprises an Internet terminal plug-in 30 (IT plug-in) for the Internet browser 26a. The IT plug-in 30 is provided for communicating with the smart card 20a connected to the computer 22a via the smart card reader 21a in order to perform operations on the smart card 20a.

The smart card operations to be performed are determined by a service provider (SP) having a web server 18. In the present embodiment the SP web server 18 is distinct from the ITP web server 14, however, the two may coincide as will be discussed later on. Both the ITP web server 14 and the SP web server 18 are running a standard HTML based web application with which the Internet browser 26a of the computer 22a may establish connection.

The IT client module 28 further comprises an Internet terminal web application 32 (IT web application) that is either ad-hoc downloaded from the ITP web server 14 or installed on the computer 22a. In either case the IT web application 32 can be launched by the Internet browser 26a.

The Internet terminal 10 illustrated in FIG. 1 is applied as follows.

The user launches the Internet browser 26a on the computer 22a to download a service provider web application 34 from the SP web server 18 (or launch a previously downloaded and installed) service provider web application 34 and execute it. The user preferably identifies himself via the SP web application 34 after which he is allowed by the SP web application 34 to request the performance of an operation on the smart card 20a. Such operation may include uploading and installing a new application; personalisation of an installed application, life-cycle management of an installed application, management of already installed application data and states, etc.

The request is transmitted from the SP web application 34 to the SP web server 18 via the Internet browser 26a in Step 100. After this the SP web server 18 establishes connection with the ITP module 12 of the ITP web server 14 preferably by building up a fix communication channel (e.g. VPN) allowing for high speed secure communication. In Step 102 a request for context is sent to the ITP module 12 running on the ITP web server 14 from the SP web server 18 over the fix communication channel. The request for context preferably includes ordering from the ITP module 12 the process of performing the requested operation. If the operation can be performed by the ITP module 12 then the SP web server 18 transmits the necessary data or data files. For example the SP web server 18 transmits an installation file for a new application ordered by the user, which will be uploaded and installed by the ITP module 12 on to the smart card 20a. Alternatively, the SP web server 18 may send identification data which will allow the ITP module 12 to download the installation file from a third web server.

Operations may be performed on the smart card 20a by sending standard APDU commands to the smart card 20a. The APDU commands are generated by the ITP module 12 if the ITP module 12 is responsible for performing the requested operation, otherwise the APDU commands are generated by the service provider (typically on the SP web server 18) and the ITP module 12 acts as a proxy to transmit the APDU commands.

For reasons of security the ITP module 12 preferably only performs uploading and installation of a new application on to the smart card 20a using an install file received from the SP web server 18 or from another web server indicated by the service provider. Other operations, such as personalising an existing smart card application or uploading or modifying a product or service is preferably performed by the service provider (the SP web server 18).

The context parameters may include configuration parameters for the IT client module 28 and authentication parameters, such as a One Time Password (OTP) generated by the ITP module 12. The context parameters are sent back to the SP web server 18 in Step 104, from where it is transmitted to the SP web application 34 in Step 106.

In Step 108 the SP web application 34 uses the context parameters to redirect the Internet browser 26a to the URL of the ITP module 12, from where the IT web application 32 is downloaded and launched by the Internet browser 26a and the context parameters are used to parameterise the IT web application 32 for establishing connection between the ITP module 12 and the IT web application 32 forming part of the client module 28. Alternatively, the context parameters may be used to launch the pre-installed IT web application 32 and parameterise it. The Internet browser 26a or the IT web application 32 verifies whether or not the IT plug-in 30 (as a component of the IT client module 28) has been downloaded and installed, and if not, the IT plug-in 30 is downloaded and installed in the usual way.

Authentication of the requested performance of the operation is carried out in Step 110: the IT web application 32 establishes connection (e.g. http request, xhtml request, websocket) with the ITP module 12 hosted on the ITP web server 14 using the context parameters obtained in Step 106, and sends a request for communication with the obtained authentication parameters, preferably the OTP.

The ITP module 12 verifies the request and if the authentication is successful it sends back an authentication response in Step 112 and establishes a secure communication channel.

As a result of the preceding steps a remote connection is established between the ITP module 12 and the IT web application 32 forming part of the IT client module 28.

The IT web application 32 uses the IT plug-in 30 to detect any smart card 20a connected to the computer 22a. Preferably the IT plug-in 30 locates all the smart card readers 21a connected to the computer 22a and constantly monitors whether a smart card 20a is detected by any one of the smart card readers 21a. If a smart card 20a is inserted into or placed adjacent the smart card reader 21a (depending on the type of reader 21a and smart card 20a) the IT plug-in 30 detects the smart card 20a and obtains basic information from the smart card 20a in Step 114 via the smart card reader 21a.

After detection of the smart card 20a, in Step 116, the IT web application 32 opens a virtual communication channel between the ITP module 12 and the smart card 20a over the already established connection between the IT web application 32 and the ITP module 12, wherein the IT plug-in 30 is used to communicate with the smart card 20a over the smart card reader 21a.

The virtual communication channel is used to transmit smart card commands (APDU commands) to the smart card 20a in Step 118. The commands are determined by the service provider and are either generated by the service provider (the SP web server 18) and transmitted via the ITP module 12 serving as a proxy or the commands are generated by the ITP module 12 in accordance with a prior order received from the SP web server 18 as explained earlier on.

The APDU commands are transmitted to the smart card 20a with the help of the IT plug-in 30 in Step 120 and the commands are executed, whereby the operation requested by the user is performed on the smart card 20a.

For the purpose of communication between the computer 22a and the SP web server 18 and between the computer 22a and the ITP web server 14 secure http (https) protocol may be used wherein data is coded in the http header and body fields. Alternatively, an XML message structure may be used which defines a separate XML message file for each interaction that is transmitted by http or websocket or any other more advanced protocol.

The http protocol does not provide full protection, however, this is not necessary, as the secure communication channel is established between the ITP web server 14 and the application on the smart card 20a or between the SP web server 18 and the application on the smart card 20a (if the ITP web server 14 is acting as a proxy). This secure communication channel may be based on Global Platform Secure Channel protocol for example. This protocol effectively protects against various attacks (man-in-the-middle, replay, etc.)

Figure 2:
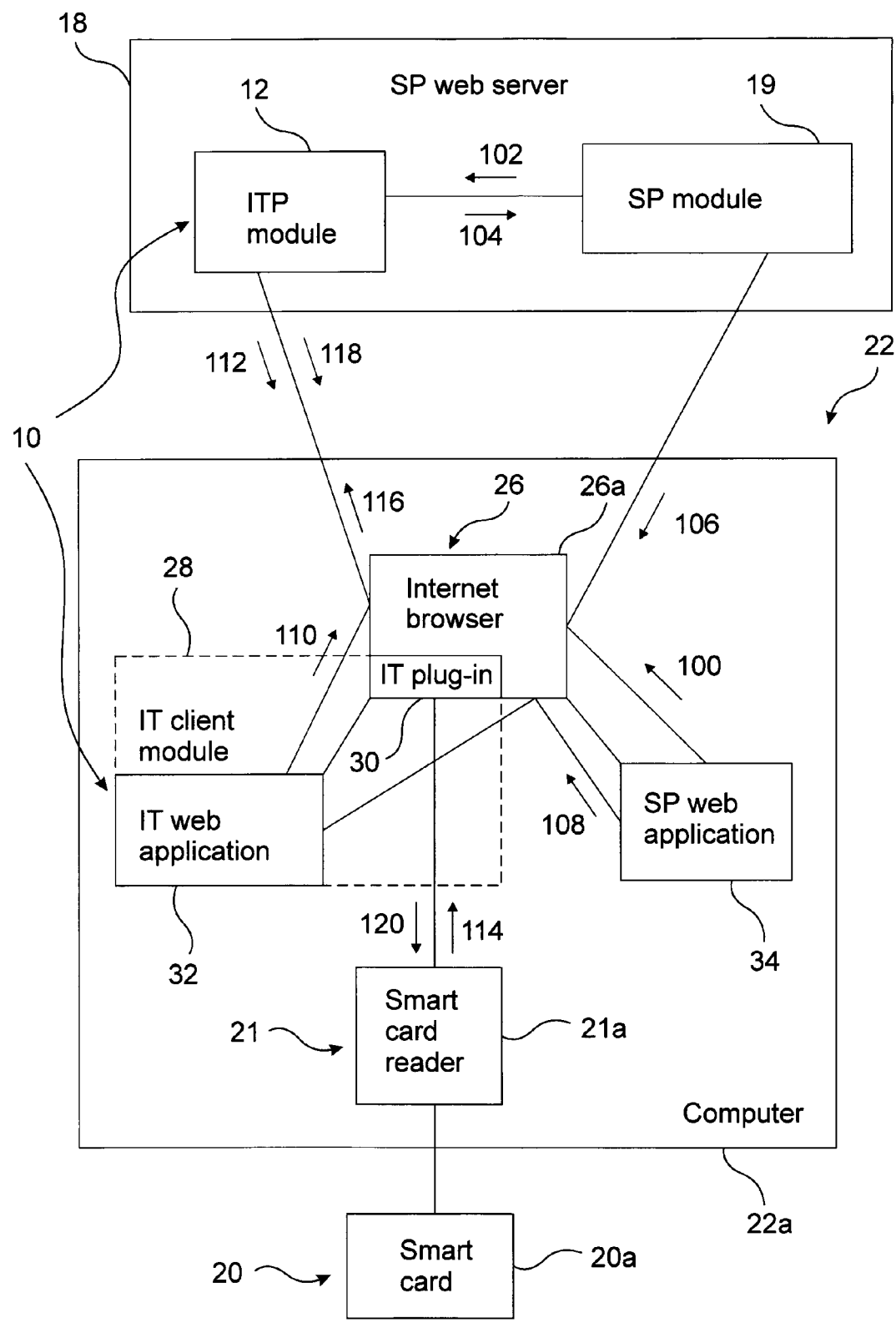
FIG. 2 is a schematic diagram illustrating the application of an Internet terminal according to a second embodiment of the invention.

FIG. 2 depicts an alternative embodiment of the invention wherein the ITP module 12 of the Internet terminal 10 is installed on the SP web server 18. In this case we may differentiate between a service provider specific SP module 19 running on the SP web server 18 and the non service provider specific ITP module 12 also running on the SP web server 18. Otherwise the computer 22a and the Internet terminal 10 are identical to the first embodiment depicted in FIG. 1. The steps for performing a requested operation on the smart card 20a are also identical the only difference being that the SP web application 34 communicates with the SP module 19 of the SP web server 18 in Steps 100 and 106, and the context parameters are requested by the SP module 19 from the ITP module 12 in Step 102 in response of which the context parameters are sent back to the SP module 19 from the ITP module 12 in Steps 104.

Figure 3:
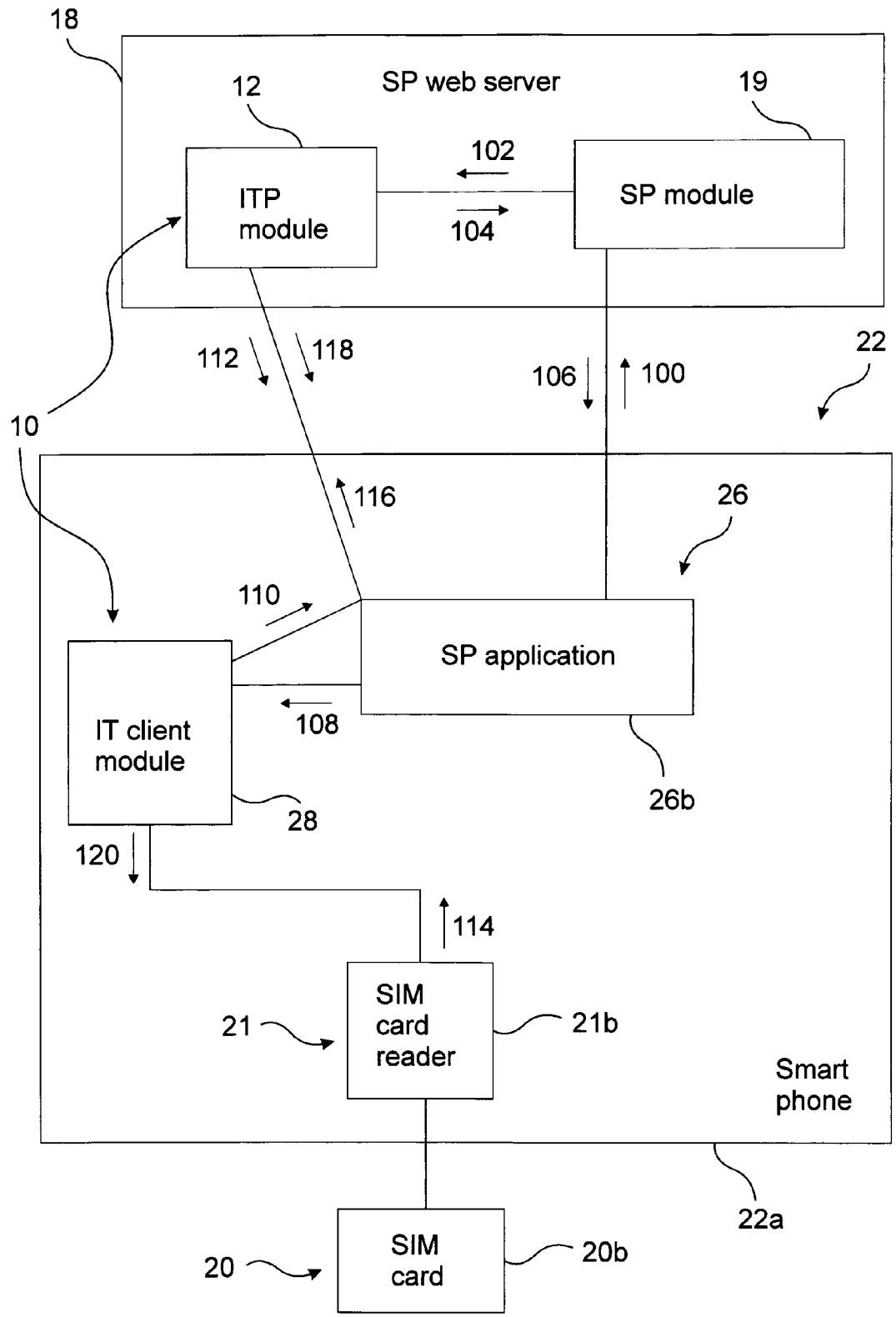
FIG. 3 is a schematic diagram illustrating the application of an Internet terminal according to a third embodiment of the invention.

FIG. 3 depicts an embodiment wherein the communication device 22 is a smart phone 22b and the secure element 20 is a SIM card 20b that is connected to the smart phone 22b via the secure element interface 21 being a SIM card reader 21b. In the illustrated embodiment the user application 26 is not an Internet browser 26a but a dedicated application 26b of the service provider that is capable of IP based communication. The dedicated SP application 26b is also adapted to launch the non service provider specific IT client module 28 that is installed on the smart phone 22b. The process of performing an operation on the SIM card 20b is very similar to the process described in connection with the embodiment illustrated in FIGS. 1 and 2, the difference being the following. When wishing to perform an operation on the SIM card 20b the user launches the SP application 26b and selects the desired operation. The request is transmitted from the SP application 26b to the SP module 19 of the SP web server 18 in Step 100, preferably using an IP based communication channel (http, web service call, websocket). After this a request for context is sent to the ITP module 12 from the SP module 19 in Step 102, which request includes ordering the process of performing the requested operation from the ITP module 12. The context parameters are sent back to the SP module 19 in Step 104, from where it is transmitted to the dedicated SP application 26b in Step 106.

The SP application 26b verifies whether or not an IT client module 28 is installed on the smart phone 22b, and if not, then it downloads the non service provider specific IT client module 28 from the SP web server 18 or a web server indicated by the SP module 19 and installs it.

The context parameters are used by the SP application 26b to launch the IT client module 28 which connects to the ITP module 12 running on the SP web server 18 in the present case. When connecting to the ITP module 12 the IT client module 28 preferably authenticates itself in Step 110 by sending data contained in the context parameters, preferably an OTP.

The ITP module 12 verifies the request and if the authentication is successful it sends back an authentication response in Step 112.

As a result of the preceding steps a remote connection is established between the ITP module 12 and the IT client module 28 which also serves to communicate with the SIM card 20b over the SIM card reader 21b. The IT client module 28 detects the SIM card 20b and obtains basic information from the SIM card 20b in Step 114 via the SIM card reader 21b.

In Step 116, the IT client module 28 opens a virtual communication channel between the ITP module 12 and the SIM card 20b over the already established connection between the IT client module 28 and the ITP module 12.

The virtual communication channel is used to transmit SIM card commands (APDU commands) to the SIM card 20b in Step 118. The commands are determined by the service provider and are either generated by the SP module 19 and transmitted via the ITP module 12 serving as a proxy or the commands are generated by the ITP module 12 itself in accordance with prior instructions received from the SP module 19.

The APDU commands are transmitted to the SIM card 20b by the IT client module 28 in Step 120 where the commands are executed, whereby the operation requested by the user is performed on the SIM card 20b.

Figure 4:
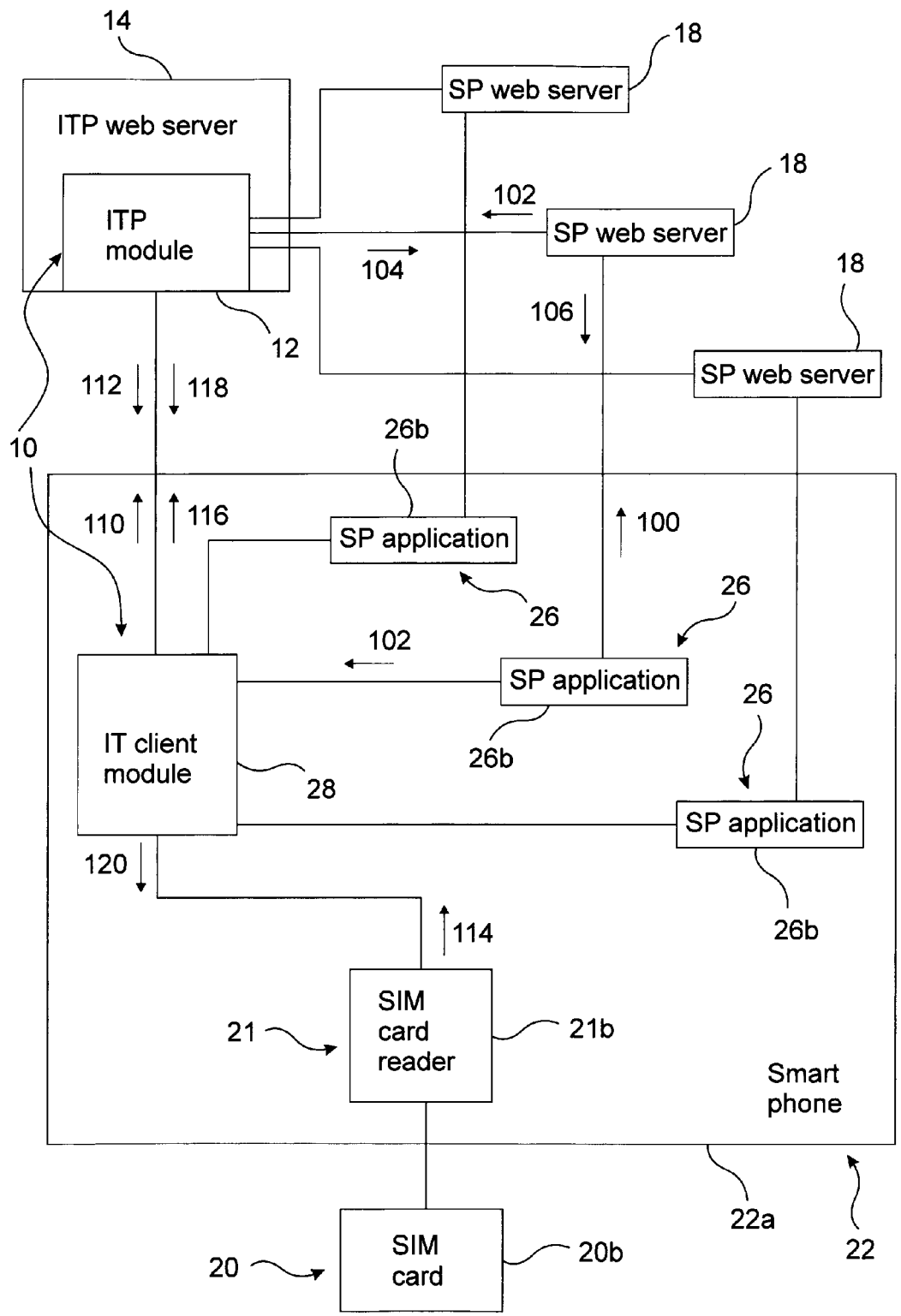
FIG. 4 is a schematic diagram illustrating the application of an Internet terminal according to a fourth embodiment of the invention.

FIG. 4 illustrates a further embodiment wherein a plurality of dedicated SP applications are installed on the smart phone 22b. A non service provider specific IT client module 28 is also installed on the smart phone 22b which IT client module 28 is common for all the dedicated SP applications 26b (i.e. the dedicated user applications 26 of the different service providers). Each SP application 26b is configured to connect to the web server 18 of its own service provider. The SP web servers 18 may each have their own non service provider specific ITP module running thereon, or the SP web servers 18 may contact a common ITP module 12 installed and running on an independent ITP web server 12 as illustrated in FIG. 4. The process of performing a user selected operation on the SIM card 20b is similar to the process described in connection with the other embodiments the main difference being that the user must first choose and launch the SP application 26b belonging to the service provider from whom performance of a desired operation is to be requested. After this the selected SP application 26b plays the role of the user application 26 connecting to the SP web server 18 and launching the IT client module 28. The process steps following this are identical to those discussed in connection with the embodiment illustrated in FIG. 3. The communication between the ITP module 12 and the IT client module 28 may take place over the user application 26 (i.e. the selected SP application 26b) which is capable of IP based communication, however, in the case of a plurality of service providers and dedicated SP applications 26b it is more preferred to establish and use a separate communication channel between the ITP module 12 and the IT client module 28 that is independent of the SP application as illustrated in FIG. 4.

The above-described embodiments are intended only as illustrating examples and are not to be considered as limiting the invention. Various modifications will be apparent to a person skilled in the art without departing from the scope of protection determined by the attached claims.

The invention claimed is:

1. Method for remotely performing operations determined by a service provider on a secure element connected to a secure element interface of a communication device having a user application capable of IP based communication, characterised by:
   providing, by a computer, a non service provider specific Internet terminal client module for the user application for establishing connection with the secure element;
   obtaining context parameters for connection to an Internet terminal provider module hosted on a remote server via the user application;
   launching the Internet terminal client module by the user application;
   using the context parameters to establish remote connection between the Internet terminal provider module and the Internet terminal client module;
   detecting the secure element connected to the secure element interface of the communication device via the Internet terminal client module;
   opening a virtual communication channel between the Internet terminal provider module and the secure element over the connection between the Internet terminal client module and the Internet terminal provider module;
   transmitting secure element commands determined by the service provider to the secure element over the virtual communication channel and performing an operation corresponding to the secure element commands on the secure element via the secure element interface;
   wherein the user application runs in an Internet browser and the Internet terminal client module comprises an Internet terminal plug-in for establishing the connection with the secure element and an Internet terminal web application that can be launched by the user application for connecting to the Internet terminal provider module and for opening a virtual communication channel between the Internet terminal provider module and the secure element over the Internet terminal plug-in.

2. The method according to claim 1, wherein the step of obtaining context parameters is preceded by a step of downloading and executing a service provider web application from the service provider's web server via the Internet browser, and allowing a user to request the performance of an operation via the service provider web application.

3. The method according to claim 2, wherein the context parameters are provided by the Internet terminal provider module to the service provider's web server and are sent to the service provider web application running in the browser, and the context parameters are used to redirect the Internet browser to an URL of the Internet terminal provider module from where the Internet terminal web application is launched with the obtained context parameters.

4. The method according to claim 2, wherein obtaining context parameters is preceded by the step of ordering the requested performance of an operation from the Internet terminal provider module by the service provider, and the secure element commands are generated by the Internet terminal provider module in accordance with the order.

5. The method according to claim 1, wherein the secure element commands are generated on the web server of the service provider and the Internet terminal provider module is configured to act as a proxy for the web server and to transmit the secure element commands to the secure element over the virtual channel.

6. The method according to claim 1, wherein the Internet terminal provider module is located on the web server of the service provider.

7. Method for remotely performing operations determined by a service provider on a secure element connected to a secure element interface of a communication device having a user application capable of IP based communication, characterised by:
   providing, by a computer, a non service provider specific Internet terminal client module for the user application for establishing connection with the secure element;
   obtaining context parameters for connection to an Internet terminal provider module hosted on a remote server via the user application;

launching the Internet terminal client module by the user application;

using the context parameters to establish remote connection between the Internet terminal provider module and the Internet terminal client module;

detecting the secure element connected to the secure element interface of the communication device via the Internet terminal client module;

opening a virtual communication channel between the Internet terminal provider module and the secure element over the connection between the Internet terminal client module and the Internet terminal provider module;

transmitting secure element commands determined by the service provider to the secure element over the virtual communication channel and performing an operation corresponding to the secure element commands on the secure element via the secure element interface.

8. The method according to claim 2, wherein the user application is a dedicated application of the service provider that is adapted to launch the non service provider specific Internet terminal client module.

9. The method according to claim 8, wherein the Internet terminal client module is common for a number of dedicated user applications of different service providers.

10. The method according to claim 2, wherein the step of providing the non service provider specific Internet terminal client module is carried out by verifying via the user application whether or not all components of the Internet terminal client module is installed and if not downloading and installing the missing components of the Internet terminal client module.

11. The method according to claim 2, wherein the step of using the context parameters includes authentication of the requested performance of an operation based on the context parameters.

12. The method according to claim 11, wherein the context parameters include a one-time password provided by the Internet terminal provider module.

13. The method according to claim 2, wherein the remotely performed operations are chosen from a group consisting of uploading and installing a new application; personalisation of an installed application, life-cycle management of an installed application; in-life management of already installed application data and states.

* * * * *